(12) United States Patent
Nagarajegowda et al.

(10) Patent No.: US 11,709,618 B2
(45) Date of Patent: Jul. 25, 2023

(54) AUTOMATICALLY PROCESSING STORAGE SYSTEM DATA AND GENERATING VISUALIZATIONS REPRESENTING DIFFERENTIAL DATA COMPARISONS

(71) Applicant: Dell Products L.P., Round Rock, TX (US)

(72) Inventors: Deepak Nagarajegowda, Cary, NC (US); Bina K. Thakkar, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/212,767

(22) Filed: Mar. 25, 2021

(65) Prior Publication Data
US 2022/0308785 A1    Sep. 29, 2022

(51) Int. Cl.
  *G06F 12/08*    (2016.01)
  *G06F 12/0808*  (2016.01)
  *G06F 12/0815*  (2016.01)
  *G06F 3/06*     (2006.01)

(52) U.S. Cl.
  CPC .......... *G06F 3/0653* (2013.01); *G06F 3/0604* (2013.01); *G06F 3/067* (2013.01); *G06F 3/0623* (2013.01); *G06F 3/0659* (2013.01)

(58) Field of Classification Search
  CPC ............................. G06F 3/0619; G06F 3/0659
  USPC ....................................................... 711/154
  See application file for complete search history.

(56) References Cited

U.S. PATENT DOCUMENTS

| | | | |
|---|---|---|---|
| 7,376,804 B2 * | 5/2008 | Ido | G06F 11/1451 |
| | | | 711/112 |
| 9,349,200 B2 | 5/2016 | Cardno | |
| 9,507,686 B2 * | 11/2016 | Horn | H04L 41/147 |
| 9,881,014 B1 * | 1/2018 | Bono | G06F 3/065 |
| 9,916,535 B2 * | 3/2018 | Nicholson | G06N 5/04 |
| 10,235,066 B1 * | 3/2019 | Chen | G06F 3/0619 |
| 10,462,214 B2 | 10/2019 | Hartano et al. | |
| 10,789,261 B1 * | 9/2020 | Nguyen | G06F 16/282 |

(Continued)

FOREIGN PATENT DOCUMENTS

NL    WO2020/114860    *   6/2020    ............. G06F 21/74

*Primary Examiner* — Mohamed M Gebril
(74) *Attorney, Agent, or Firm* — Ryan, Mason & Lewis, LLP

(57) ABSTRACT

Methods, apparatus, and processor-readable storage media for automatically processing storage system data and generating visualizations representing differential data comparisons are provided herein. An example computer-implemented method includes obtaining current data from a first storage system and historical data from the first storage system and/or one or more additional storage systems; determining, for the first storage system, at least one current state value for at least one storage system parameter by processing the current data using a first hashing algorithm; determining, for the first storage system with respect to the first storage system and/or the additional storage systems, at least one differential state value for the at least one storage system parameter by processing the current data and the historical data using a second hashing algorithm; and generating data visualizations based on the current state value(s) and/or the differential state value(s).

20 Claims, 12 Drawing Sheets

(56) References Cited

U.S. PATENT DOCUMENTS

| | | | |
|---|---|---|---|
| 11,157,177 B2* | 10/2021 | Gazit | G06F 3/067 |
| 2004/0078533 A1* | 4/2004 | Lee | G06F 11/1456 |
| | | | 714/E11.12 |
| 2004/0158566 A1* | 8/2004 | Chong, Jr. | G06F 11/1466 |
| 2013/0080353 A1* | 3/2013 | Kovarsky | G06Q 40/06 |
| | | | 705/36 R |
| 2016/0019211 A1* | 1/2016 | Patey | H04L 9/00 |
| | | | 707/747 |
| 2017/0220777 A1* | 8/2017 | Wang | G06F 21/6218 |
| 2017/0315878 A1* | 11/2017 | Purohit | G06F 16/24573 |
| 2018/0174062 A1* | 6/2018 | Simo | G06N 3/0454 |
| 2018/0174072 A1* | 6/2018 | Charles | G06N 5/02 |
| 2018/0349334 A1* | 12/2018 | Cheung | G06F 3/0482 |
| 2019/0294715 A1* | 9/2019 | Gupta | G06F 16/17 |
| 2019/0354399 A1* | 11/2019 | Bykov | G06Q 10/04 |
| 2020/0026653 A1* | 1/2020 | Shveidel | G06F 12/0868 |
| 2020/0230499 A1* | 7/2020 | Buser | A63F 13/352 |
| 2020/0349110 A1* | 11/2020 | Shveidel | G06F 16/128 |
| 2021/0117118 A1* | 4/2021 | Stoica | G06F 3/0604 |
| 2021/0117317 A1* | 4/2021 | Masuo | G06F 3/0679 |
| 2021/0216531 A1* | 7/2021 | Shveidel | G06F 16/2365 |
| 2022/0050605 A1* | 2/2022 | Gremaud | G06F 21/78 |
| 2022/0221992 A1* | 7/2022 | Shveidel | G06F 3/0653 |
| 2022/0308785 A1* | 9/2022 | Nagarajegowda | G06F 3/0605 |

* cited by examiner

| Timestamp | System | Firmware Version | Number of LUNs | Number of File Systems | RAID type | Number of Hard Disks | Disk Type | Capacity Usage |
|---|---|---|---|---|---|---|---|---|
| 2020-01-01 16:00:00 | abcd_100 | 1.2.1 | 10 | 1150 | RAID5 | 250 | HDD+SSD | 75 |
| 2020-01-01 17:00:00 | abcd_101 | 1.0.1 | 346 | 150 | RAID5 | 250 | HDD+SSD | 75 |
| 2020-01-01 18:00:00 | abcd_102 | 1.2.2 | 100 | 200 | RAID6 | 250 | SSD | 90 |

AUTOMATICALLY PROCESSING STORAGE SYSTEM DATA AND GENERATING VISUALIZATIONS REPRESENTING DIFFERENTIAL DATA COMPARISONS

FIELD

The field relates generally to information processing systems, and more particularly to storage in such systems.

BACKGROUND

User support task resolution traditionally consumes non-trivial amounts of time. For example, with respect to storage-as-a-service (STaaS) systems, conventional user support techniques require support team members to process large amounts of telemetry data and log files, and manually consider current configurations and behaviors of the given STaaS system(s) in order to perform troubleshooting and root cause analysis tasks. However, such techniques are commonly time-intensive and error-prone.

SUMMARY

Illustrative embodiments of the disclosure provide techniques for automatically processing storage system data and generating visualizations representing differential data comparisons. An exemplary computer-implemented method includes obtaining current data from a first storage system and historical data from at least one of the first storage system and one or more additional storage systems, and determining, for the first storage system, at least one current state value for at least one storage system parameter by processing at least a portion of the current data using at least a first hashing algorithm. The method also includes determining, for the first storage system with respect to at least one of the first storage system and the one or more additional storage systems, at least one differential state value for the at least one storage system parameter by processing at least a portion of the current data and at least a portion of the historical data using at least a second hashing algorithm. Further, the method additionally includes generating one or more data visualizations based at least in part on one or more of the at least one current state value and the at least one differential state value.

Illustrative embodiments can provide significant advantages relative to conventional user support techniques. For example, problems associated with time-intensive and error-prone manual processing approaches are overcome in one or more embodiments through automatically processing storage system data and generating visualizations representing differential data comparisons across systems and/or temporal instances.

These and other illustrative embodiments described herein include, without limitation, methods, apparatus, systems, and computer program products comprising processor-readable storage media.

BRIEF DESCRIPTION OF THE DRAWINGS

FIG. 3 shows an example table of time series telemetry data of systems with known issues in an illustrative embodiment.

FIG. 9 shows an example system differential state visualization in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
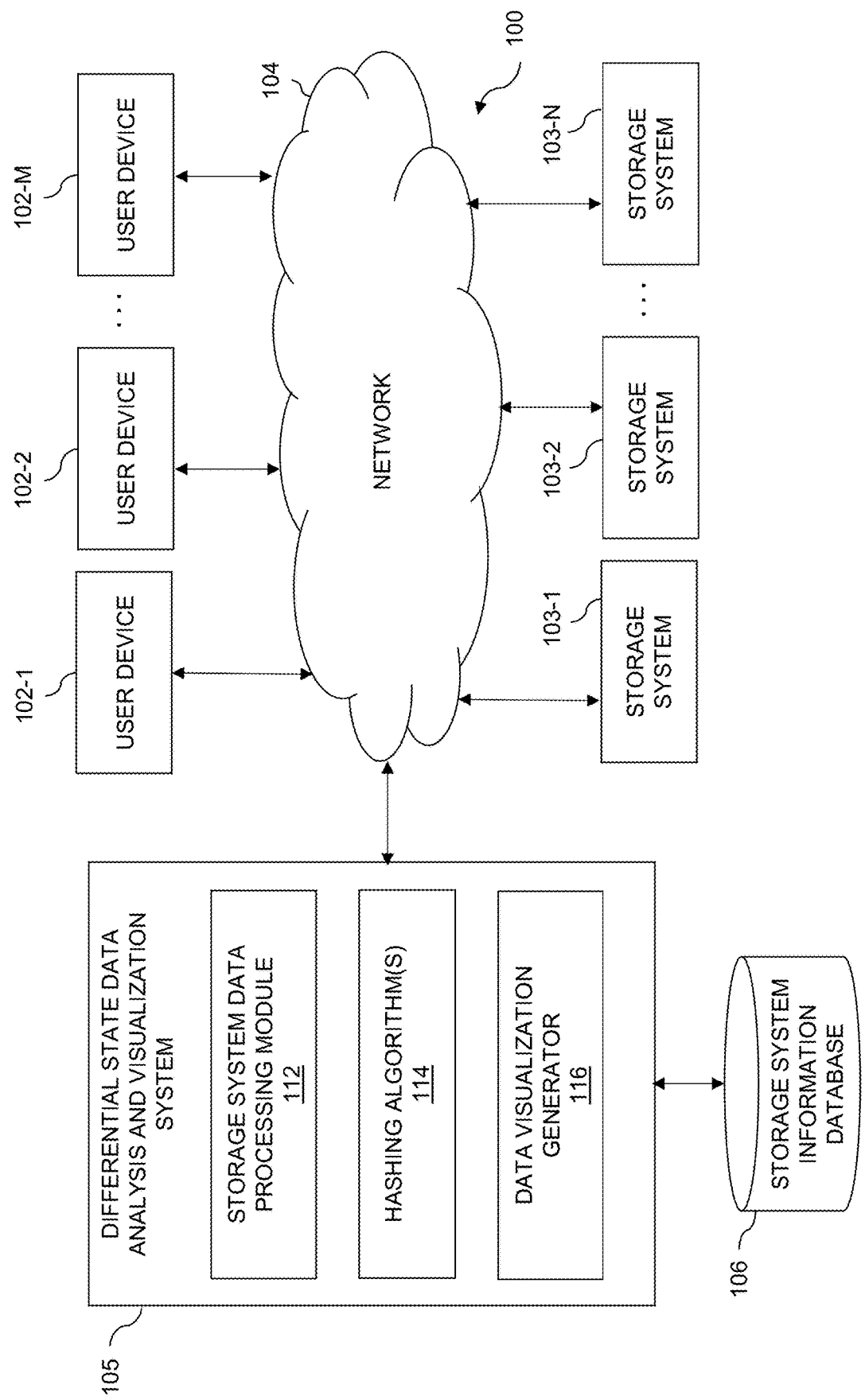
FIG. 1 shows an information processing system configured for automatically processing storage system data and generating visualizations representing differential data comparisons in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102, and a plurality of storage systems 103-1, 103-2, . . . 103-N, collectively referred to herein as storage systems 103. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is differential state data analysis and visualization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The storage systems 103 may comprise, for example, storage objects such as pools, file systems, logical storage volumes (e.g., logical units or LUNs), etc. The storage systems 103 (e.g., STaaS systems) in some embodiments comprise respective storage systems associated with a particular company, organization or other enterprise.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Additionally, differential state data analysis and visualization system 105 can have an associated storage system information database 106 configured to store data pertaining to one or more storage objects of storage systems 103, which comprise, for example, configuration data, performance-related data, capacity-related data, data protection information, etc.

The storage system information database 106 in the present embodiment is implemented using one or more storage systems associated with differential state data analysis and visualization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with differential state data analysis and visualization system 105 can be one or more input-output devices, which illustratively comprise keyboards, displays or other types of input-output devices in any combination. Such input-output devices can be used, for example, to support one or more user interfaces to differential state data analysis and visualization system 105, as well as to support communication between differential state data analysis and visualization system 105 and other related systems and devices not explicitly shown.

Additionally, the differential state data analysis and visualization system 105 in the FIG. 1 embodiment is assumed to be implemented using at least one processing device. Each such processing device generally comprises at least one processor and an associated memory, and implements one or more functional modules for controlling certain features of differential state data analysis and visualization system 105.

More particularly, differential state data analysis and visualization system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows differential state data analysis and visualization system 105 to communicate over the network 104 with the user devices 102 and/or storage systems 103, and illustratively comprises one or more conventional transceivers.

The differential state data analysis and visualization system 105 further comprises storage system data processing module 112, hashing algorithm(s) 114, and data visualization generator 116.

It is to be appreciated that this particular arrangement of elements 112, 114 and 116 illustrated in differential state data analysis and visualization system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for automatically processing storage system data and generating visualizations representing comparisons of data across storage systems and temporal instances involving storage systems 103 and user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, differential state data analysis and visualization system 105 and storage system information database 106 can be implemented in at least one of the storage systems 103 and/or in an associated management server or set of servers.

An exemplary process utilizing elements 112, 114 and 116 of an example differential state data analysis and visualization system 105 in computer network 100 will be described in more detail with reference to the flow diagram of FIG. 10.

Accordingly, at least one embodiment includes automatically processing storage system (e.g., STaaS system) data and generating visualizations representing comparisons and/ or differentiations for various metrics across systems and temporal instances. As detailed herein, such an embodiment includes facilitating and/or assisting managed services to quickly and easily process and/or understand current and differential states for various aspects of storage system and/or storage object data (e.g., configuration data, capacity metrics, performance metrics, data protection facets, etc.). For example, at least one embodiment includes automatically processing data pertaining to changes of various components of a storage system (e.g., a STaaS system), and generating and/or outputting condensed and compact visualizations of such changes and/or different facets of the storage system.

As detailed herein, one or more embodiments include analyzing current states of one or more storage systems and/or one or more storage objects. Such an embodiment includes calculating at least one facet score with respect to telemetry data, capacity-related data, performance-related data, and/or data protection information. In calculating such a facet score, various metrics can be used in connection with the above-noted types of data and/or other types of data. For example, with respect to configuration-related data, such metrics can include logical unit or LUN count, filesystem count, raid group information, port type, etc. With respect to capacity-related data, such metrics can include sizeUsed, sizeTotal, sizeFree, deduplication ratio, etc. Also, with respect to performance-related data, such metrics can include input-output operations per second (TOPS), blocks per second (BPS), block latency, etc. Further, with respect to data protection information, such metrics can include pending snapshots, sync replication information, async replication information, etc.

Additionally, at least one embodiment includes using an algorithm such as, for example, locality sensitive hashing (LSH), for determining one or more current facet states of a storage system (e.g., a STaaS system) based at least in part on information such as current settings of the storage system, health score(s) associated with at least portions of the storage system, and alerts associated with each facet. Such an embodiment can, additionally or alternatively, include using algorithms such as one or more custom hashing algorithms, at least one binning algorithm, and/or at least one K-means clustering algorithm. Each such facet score can be generated, for example, for one or more clusters, appliances, and/or storage objects (e.g., blocks, logical storage volumes (e.g., LUNs), file systems, drives, etc.) within the given storage system.

At least one embodiment also includes analyzing differential states of one or more storage systems and/or one or more storage objects, wherein the differential consideration can be across storage systems and/or storage objects, across temporal instances, etc. In such an embodiment, proactive differential facet scores can be calculated using current data and historical data (e.g., data from the last N days (e.g., 1 day, 3 days, 7 days, 14 days, etc.)). Additionally or alternatively, reactive on-demand differential facet scores can be calculated using current data and a user-selected period of historical data (e.g., the previous N days of historical data).

As noted above and further detailed herein, an algorithm such as LSH can be used for calculating current facet scores and differential facet scores for one or more storage systems (e.g., one or more STaaS systems) and/or one or more storage objects within at least one storage system. By way of example, utilizing an LSH algorithm can enable sub-second response times for millions of rows and columns, which can facilitate proactive and on demand reactive analysis of different facets across multiple storage objects, and across a wide range of temporal periods (e.g., days) for a given storage system (e.g., a STaaS system).

Figure 2:
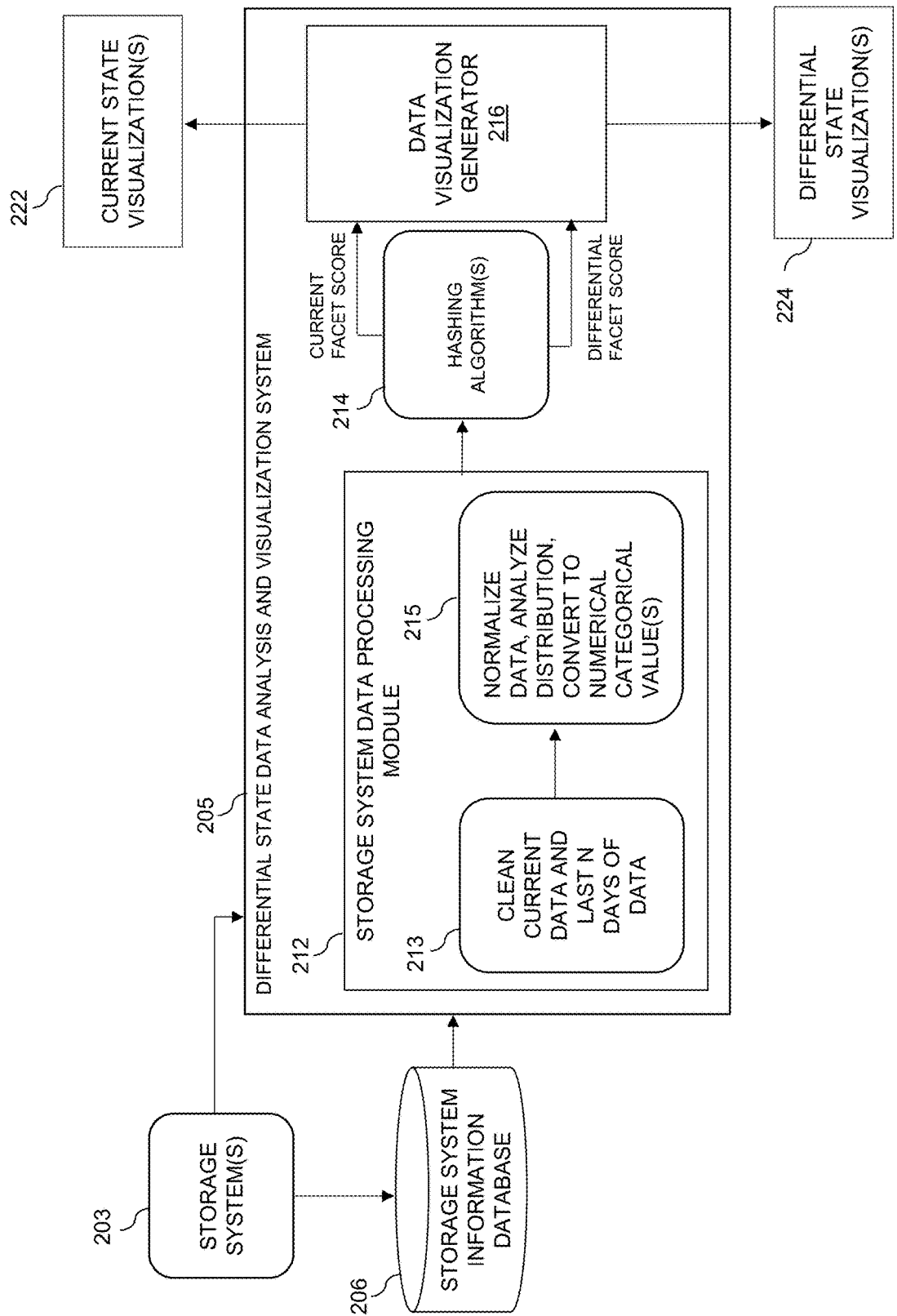
FIG. 2 shows an example workflow in an illustrative embodiment.

FIG. 2 shows an example workflow in an illustrative embodiment. By way of illustration, FIG. 2 depicts differential state data analysis and visualization system 205, which receives current data from storage system(s) 203 as well as historical data from storage system information database 206. In one or more embodiments, data collected and/or obtained by differential state data analysis and visualization system 205 can be related to storage system clusters, appliances, pools, drives, hosts, virtual machines, storage containers, etc. In such an embodiment, collected data can be separated into multiple different facets such as, for example, a telemetry facet, a capacity facet, a performance facet, and a data protection facet.

As illustrated in FIG. 2, at least a portion of the data is processed by storage system data processing module 212, which includes cleaning current data as well as historical data from the previous Ndays, as denoted in step 213. Processing the data also includes normalizing the cleaned data, analyzing distribution information, and converting at least a portion of the data to one or more categorical values, as denoted in step 215. In at least one embodiment, converting data to categorical values can include identifying the minimum value, the maximum value, and the range of the data. Subsequently, one or more techniques can be implemented to convert the numerical data to categorical data (e.g., a technique based on the domain semantics of the given metric). For example, one such techniques includes dividing the raw source data into equal intervals. By way of example, if a LUN count ranges from 0-1000, four categories can be created for 0-254, 255-500, 501-749 and 750-1000. Another technique includes identifying the distribution of data and understanding relevant domain semantics. For instance (using the above example of a LUN count ranging from 0-1000), based on LUN count distribution, four categories can be created for 0-100, 101-199, 200-600, 601-1000.

Additionally, in one or more embodiments, the collected data can be cleaned and interpolated for gaps. Also, portions of the data pertaining to items (e.g., names, etc.) that do not significantly impact a current state or a differential state are removed. For capacity-related data, performance-related data, and/or similar numeric data, a distribution analysis can be carried out across at least portions of the collected data. Based on the distribution analysis, values can be categorized (also referred to herein as bucketed) into value-based groups such as, for example, low, medium, and high.

Referring again to FIG. 2, at least a portion of the processed data output from the storage system data processing module 212 is processed using at least one hashing algorithm 214 to generate at least one current facet score and at least one differential facet score. In at least one embodiment, a facet score is calculated for each of multiple variables such as telemetry, capacity, performance and data protection. In such an embodiment, each such facet score is generated for each of one or more storage object levels (e.g., cluster, appliance, storage object (block, filesystem), drives, etc.).

As depicted in FIG. 2, hashing algorithm 214 outputs at least one current facet score and at least one differential facet score to data visualization generator 216. In at least one embodiment, hashing algorithm(s) 214 can include at least one locality sensitive hashing technique, which is used to generate the current facet score(s) based at least in part on the current storage system settings, configurations, health score(s), and/or alert(s) for each facet based on average values and current values.

Additionally, in one or more embodiments, locality sensitive hashing is used (via hashing algorithm(s) 214) to calculate at least one temporal differential state facet score. For example, such an embodiment can include using current storage system settings, configurations, health score(s), and/or alert(s) for each facet based on historical storage system values of a given temporal parameter (e.g., from the previous one day, from the previous three days, from the previous seven days, from the previous 14 days, from the previous N days, etc.) as well as the current storage system values. Additionally or alternatively, locality sensitive hashing is used (via hashing algorithm(s) 214) to calculate at least one system differential state facet score. For example, an example embodiment can include using current storage system settings, configurations, health score(s), and/or alert(s) for each facet based on a difference between values derived from other storage systems and the current system values of a given storage system.

Figure 7:
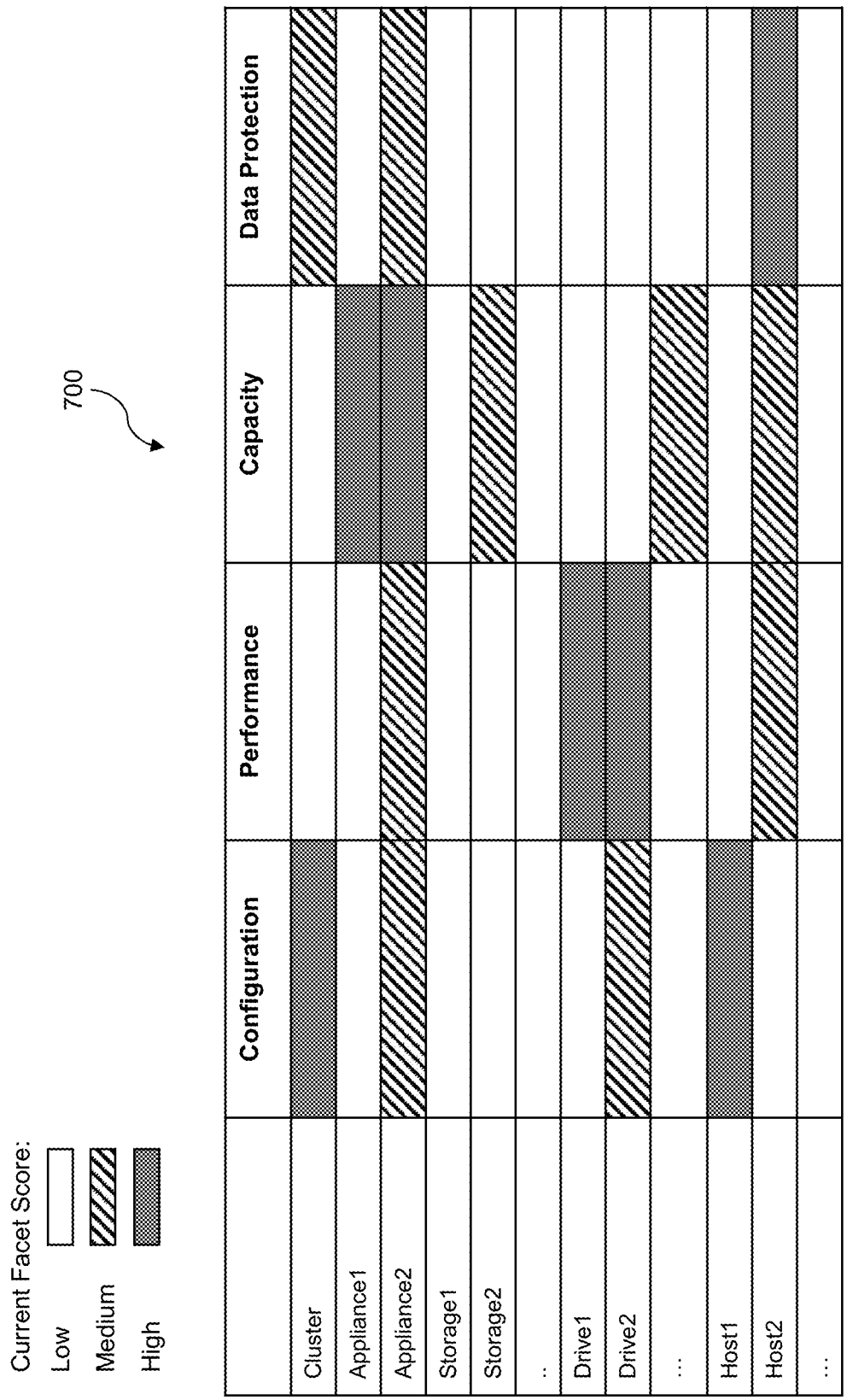
FIG. 7 shows an example current state visualization in an illustrative embodiment.

Further, referring again to FIG. 2, data visualization generator 216, based at least in part on the generated current facet score, generates and/or outputs at least one current state visualization 222 (such as, for example, depicted in FIG. 7). Additionally or alternatively, data visualization generator 216, based at least in part on the generated current facet score, generates and/or outputs at least one differential state visualization 224 (such as, for example, depicted in FIG. 8 and FIG. 9). Accordingly, in one or more embodiments, once at least one facet score is calculated (via hashing algorithm(s) 214), at least one visualization of the storage system summary can be generated (via data visualization generator 216). For example, such a visualization can include different visualized indicators (e.g., colors, shades, patterns, etc.) for categorical values and/or value ranges such as, e.g., "low," "medium," and "high."

In connection with generating a facet score, such as detailed above in connection with FIG. 2, consider the example embodiment illustrated in FIG. 3 through FIG. 6, as detailed below.

FIG. 3 shows an example table 300 of time series telemetry data of systems with known issues in an illustrative embodiment. It is to be appreciated that the data view is illustrated via table 300 is a simplified view of time series telemetry data. Typically, each row may split into hundreds and thousands of records as a given storage system can include multiple (e.g. a few thousand) storage objects.

Figure 4:
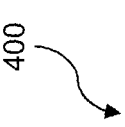
FIG. 4 shows an example table of hashed time series telemetry data in an illustrative embodiment.

FIG. 4 shows an example table 400 of hashed time series telemetry data in an illustrative embodiment. Specifically, table 400 displays a hash of each column in table 300 of FIG. 3. In accordance with one or more embodiments, a table such as table 400 can be used in building a hash model (e.g., a hash model for a given product type and model on a given day), wherein similar records will be placed into the same bucket.

Figure 5:
FIG. 5 shows an example table of a combined hash derived from time series telemetry data in an illustrative embodiment.

FIG. 5 shows an example table 500 of a combined hash derived from time series telemetry data in an illustrative embodiment. Specifically, table 500 displays a combined hash for the records illustrated in table 300 and table 400 in FIG. 3 and FIG. 4, respectively. Also, as noted herein, one or more embodiments includes converting each given record and/or document to a (small) signature using a hashing function H. In such an embodiment, if a record in a given corpus is denoted by d, then H(d) is the signature and it can be considered small enough to fit in memory. Additionally, if similarity(d1,d2) is high, then Probability (H(d1)==H(d2)) is high. Further, in such an embodiment, if similarity(d1,d2) is low, then Probability(H(d1)==H(d2)) is low. In at least one embodiment, the choice of hashing function can be linked to the similarity metric being used and/or calculated. For example, for Jaccard similarity, the appropriate hashing function is min-hashing.

With respect to using a built and/or trained hash model (e.g., such as described in connection with FIG. 4), the records within each bucket are similar as compared to the records in neighboring buckets (e.g., the records within in bucket#1 are similar to each other when compared to the records within bucket#2). Additionally, in such an embodiment, the records in neighboring buckets are similar when compared to records contained within farther away buckets and/or further distinct buckets (e.g., the records of buckets#1 are more similar to the records of bucket#2 than the records of bucket#3).

Figure 6:
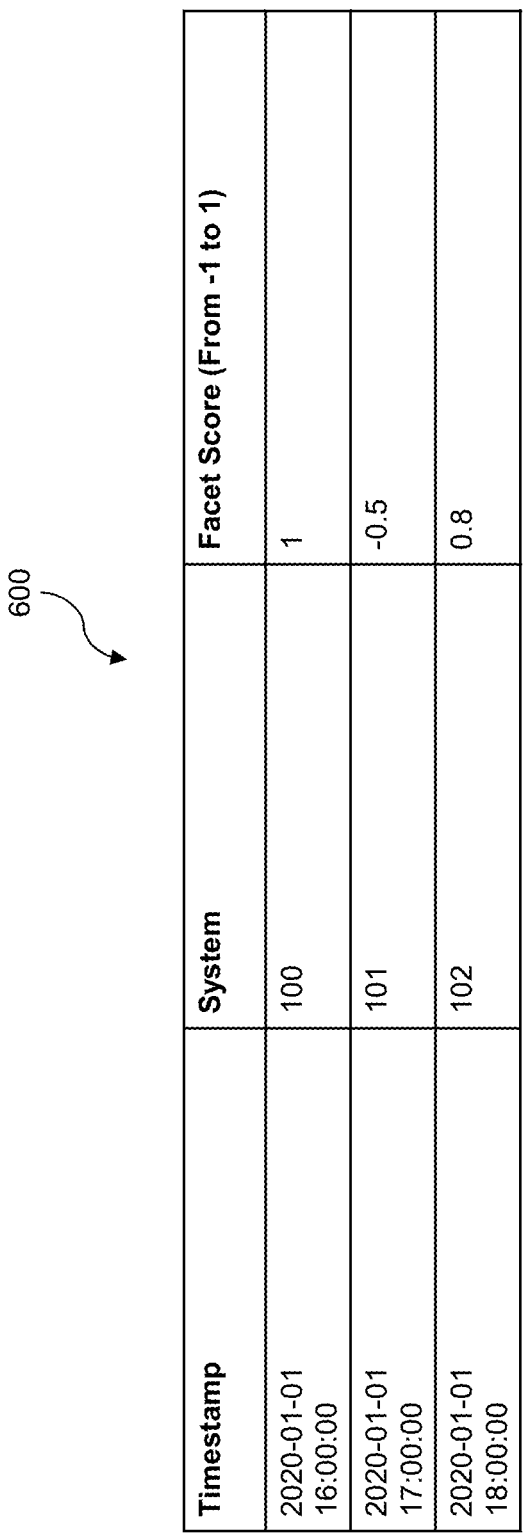
FIG. 6 shows an example table of facet scores associated with time series telemetry data in an illustrative embodiment.

FIG. 6 shows an example table 600 of facet scores associated with time series telemetry data in an illustrative embodiment. Specifically, table 600 displays facet scores (between −1 and 1) for the records illustrated in table 300, table 400, and table 500 in FIG. 3, FIG. 4, and FIG. 5, respectively. As detailed herein, in one or more embodiments, a facet score is calculated for records within each bucket based on respective hash values.

FIG. 7 shows an example current state visualization 700 in an illustrative embodiment. By way of example, visualization 700 illustrates current facet scores, at various storage object levels for a given storage system, for a configuration facet, a performance facet, a capacity facet, and a data protection facet. Also in visualization 700, a low facet score (i.e., a score within a designated "low" value range) is represented by a white rectangle, a medium facet score (i.e., a score within a designated "medium" value range) is represented by a diagonally-striped rectangle, and a high facet score (i.e., a score within a designated "high" value range) is represented by a dark grey rectangle. In at least one example embodiment, a current state calculation leverages LSH to calculate varying distance of the given storage system variable from an average system and/or setup.

Figure 8:
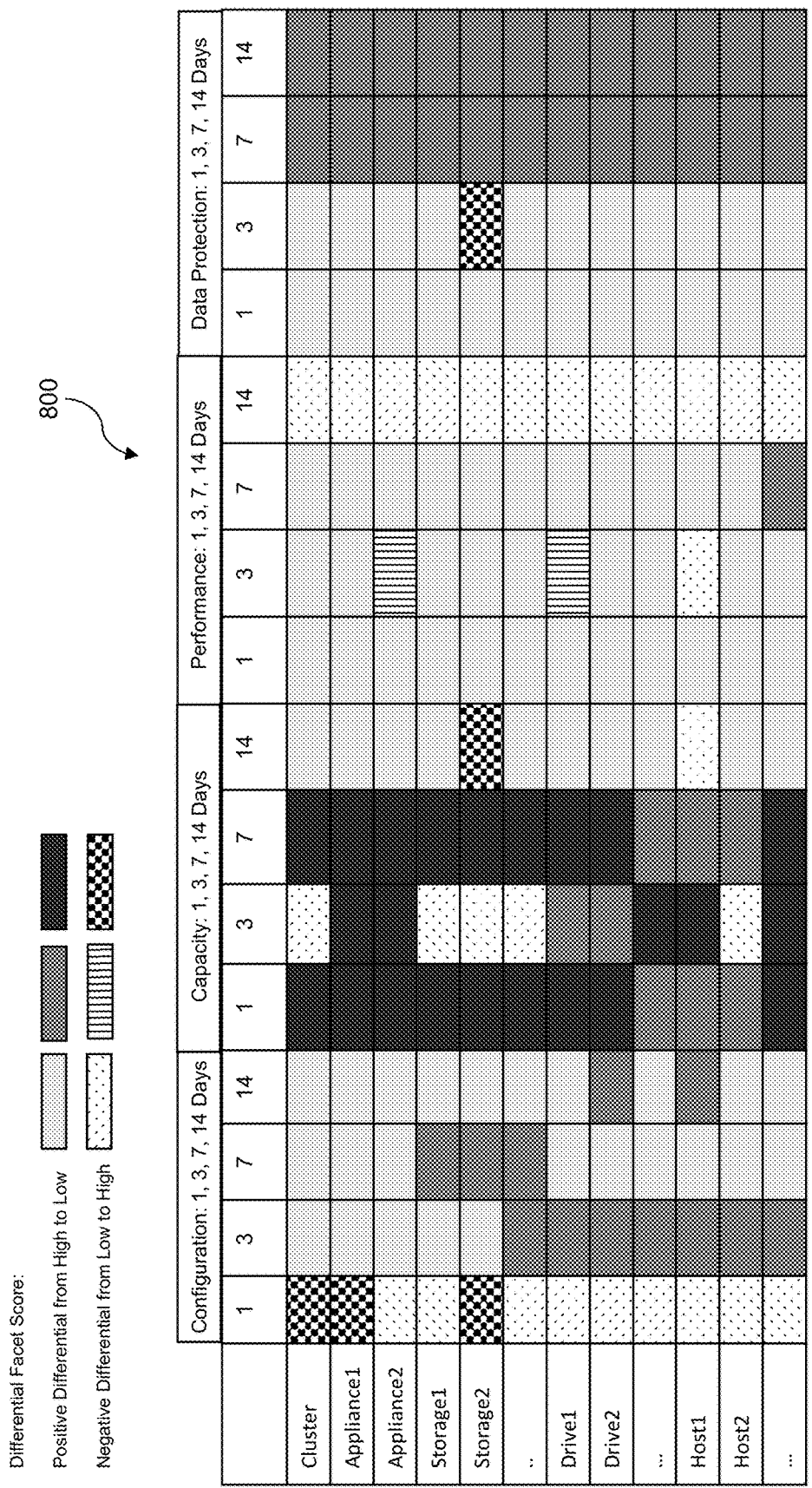
FIG. 8 shows an example temporal differential state visualization in an illustrative embodiment.

FIG. 8 shows an example temporal differential state visualization 800 in an illustrative embodiment. By way of example, visualization 800 illustrates differences in facet scores, at various storage object levels for a given storage system across one day, three days, seven days, and 14 days of previous data (with respect to a current facet score, for example), for a configuration facet, a performance facet, a capacity facet, and a data protection facet. As also depicted in visualization 800, positive differences in facet scores are represented by a first visual indication (e.g., grey shadings, ranging from a light grey shading to a dark grey shading to correspond to a high differential to a low differential). Additionally, negative differences in facet scores are represented by a second visual indication (e.g., patterns, ranging from a polka dot pattern to a vertical stripe pattern to a checkerboard pattern to correspond to a low differential to a medium differential to a high differential). In accordance with one or more embodiments, temporal differential state calculations and visualizations facilitate and/or enable automated understanding of changes between any two or more distinct temporal periods (e.g., days).

Figure 9:
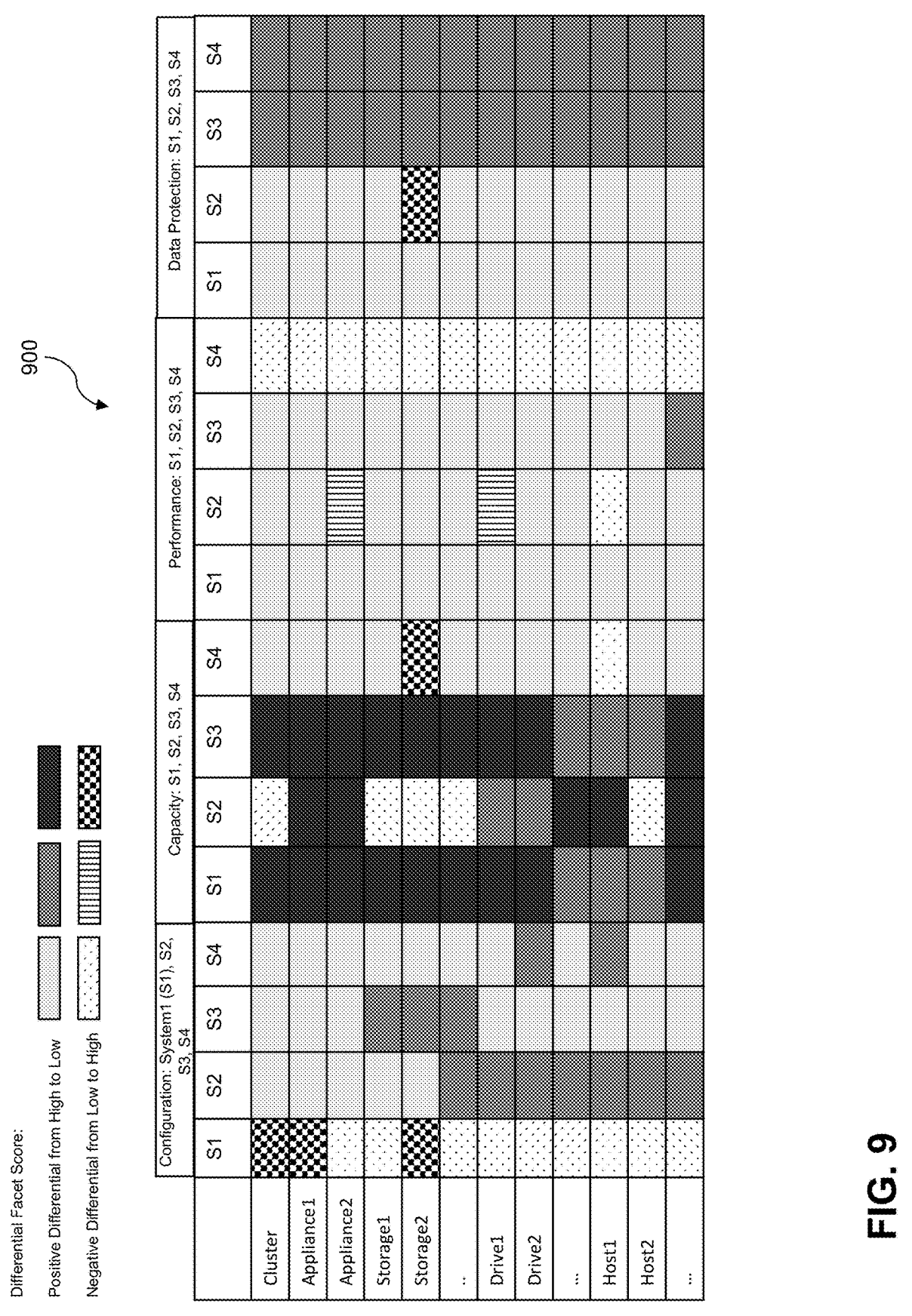

FIG. 9 shows an example system differential state visualization 900 in an illustrative embodiment. By way of example, visualization 900 illustrates differences in facet scores, at various storage object levels for a given storage system, as compared to other storage systems (e.g., storage system1 (S1), S2, S3 and S4), for a configuration facet, a performance facet, a capacity facet, and a data protection facet. As also depicted in visualization 900, positive differences in facet scores are represented by a first visual indication (e.g., grey shadings, ranging from a light grey shading to a dark grey shading to correspond to a high differential to a low differential). Additionally, negative differences in facet scores are represented by a second visual indication (e.g., patterns, ranging from a polka dot pattern to a vertical stripe pattern to a checkerboard pattern to correspond to a low differential to a medium differential to a high differential). In accordance with one or more embodiments, leveraging system differential state calculations and visualizations can facilitate and/or enable automated understanding of changes between any two or more different storage systems (e.g., STaaS systems).

Accordingly, one or more embodiments can include providing a wholistic view of an entire system (e.g., any storage array). As detailed herein, at least one facet score can be evaluated for not only each individual storage object, but for various variables and/or attributes of each storage object. In addition to such calculations, at least one embodiment includes generating and/or outputting corresponding visualizations, which can provide, for example, an efficient and/or easily-digestible summary of given storage system data, enabling one or more automated actions based thereon (e.g., notifying support personnel of specific items, performing one or more targeted remedial actions, etc.). By way merely of example, such a visualization can identify that a given storage system does not have any FS and, hence, cannot have any FS-related problems.

Further, as described herein, at least one embodiment includes using locality sensitivity hashing to calculate one or more current system facet scores, one or more temporal differential facet scores, and/or one or more system differential facet scores. It is to be appreciated that at least one local sensitivity hashing algorithm can calculate millions of differences quite quickly, enabling the techniques described herein to scale for 1000s of storage systems, for different timestamps across different systems.

Figure 10:
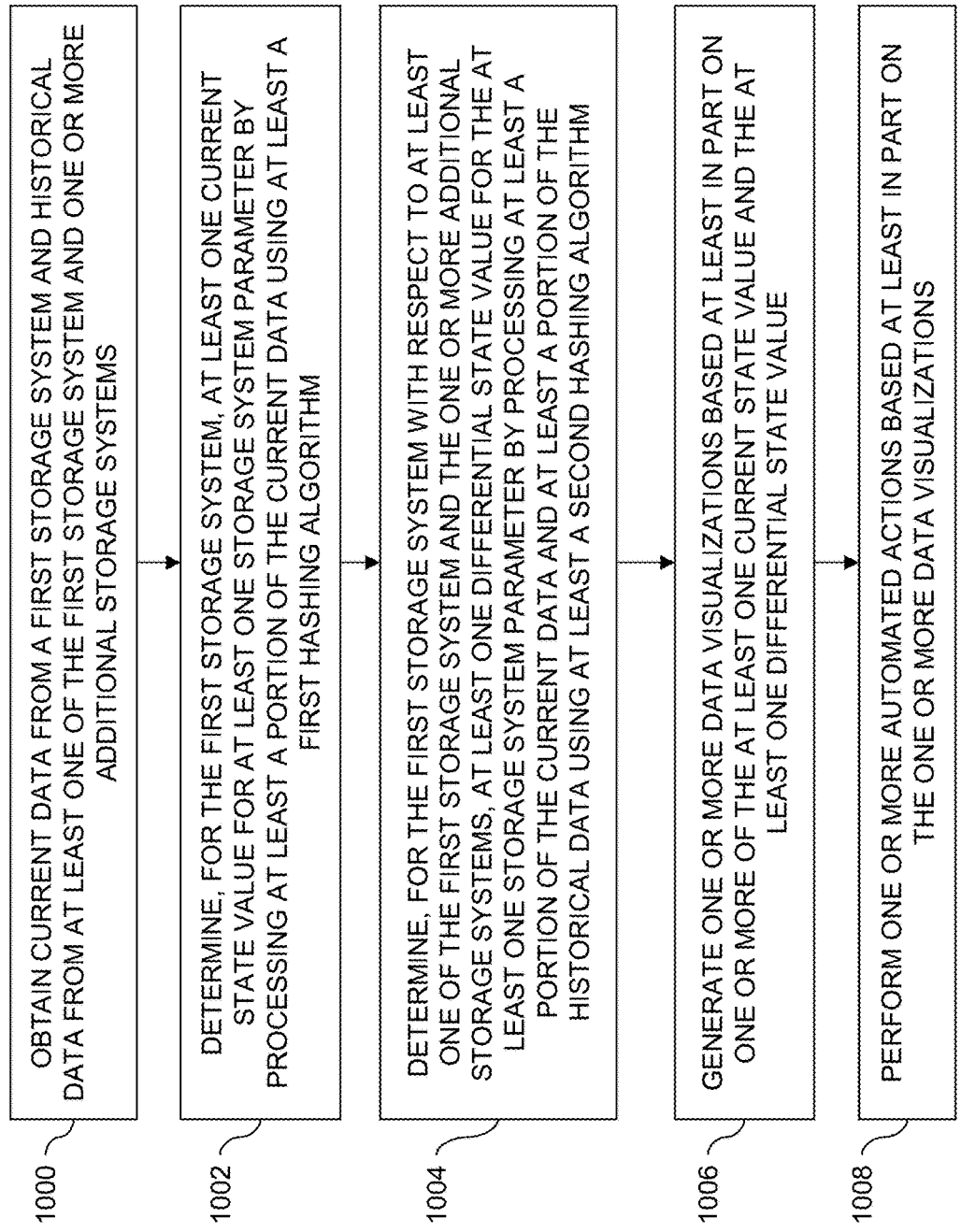
FIG. 10 is a flow diagram of a process for automatically processing storage system data and generating visualizations representing differential data comparisons in an illustrative embodiment.

FIG. 10 is a flow diagram of a process for automatically processing storage system data and generating visualizations representing differential data comparisons in an illustrative embodiment. It is to be understood that this particular process is only an example, and additional or alternative processes can be carried out in other embodiments.

In this embodiment, the process includes steps 1000 through 1008. These steps are assumed to be performed by the differential state data analysis and visualization system 105 utilizing its elements 112, 114 and 116.

Step 1000 includes obtaining current data from a first storage system and historical data from at least one of the first storage system and one or more additional storage systems. In at least one embodiment, the current data and the historical data include one or more of configuration-related data, capacity-related data, performance-related data, and information pertaining to data protection.

Step 1002 includes determining, for the first storage system, at least one current state value for at least one storage system parameter by processing at least a portion of the current data using at least a first hashing algorithm. In one or more embodiments, the at least one storage parameter includes at least one of a configuration-related parameter, a capacity-related parameter, a performance-related parameter, and a data protection parameter.

Step 1004 includes determining, for the first storage system with respect to at least one of the first storage system and the one or more additional storage systems, at least one differential state value for the at least one storage system parameter by processing at least a portion of the current data and at least a portion of the historical data using at least a second hashing algorithm. In one or more embodiments, at least one of the first hashing algorithm and the second hashing algorithm includes at least one locality sensitive hashing technique. Further, in one or more embodiments, the first hashing algorithm and the second hashing algorithm can be the same hashing algorithm, or different hashing algorithms.

In at least one embodiment, determining at least one differential state value includes determining, across multiple temporal intervals with respect to the first storage system, at least one temporal differential state value for the at least one storage parameter. In such an embodiment, the multiple temporal intervals include at least one of a designated set of temporal intervals and a user-selected set of temporal intervals. Additionally or alternatively, determining at least one differential state value can include determining, with respect to the one or more additional storage systems, at least one system differential state value for the at least one storage parameter.

Step 1006 includes generating one or more data visualizations based at least in part on one or more of the at least one current state value and the at least one differential state value. In at least one embodiment, generating one or more data visualizations includes generating a current state data visualization based at least in part on the at least current state value, wherein the current state data visualization comprises multiple visual indications representing a range of multiple state values. Additionally or alternatively, generating one or more data visualizations can include generating a temporal differential state data visualization based at least in part on the at least one differential state value, wherein the temporal differential state data visualization comprises multiple visual indications representing a range of multiple differential state values. Additionally or alternatively, generating one or more data visualizations can include generating a system differential state data visualization based at least in part on the at least one differential state value, wherein the system differential state data visualization comprises multiple visual indications representing a range of multiple differential state values.

Step 1008 includes performing one or more automated actions based at least in part on the one or more data visualizations.

Accordingly, the particular processing operations and other functionality described in conjunction with the flow diagram of FIG. 10 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically process storage system data and generate visualizations representing comparisons of data across storage systems and temporal instances. These and other embodiments can effectively overcome problems associated with time-intensive and error-prone manual processing approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 11 and 12. Although described in the context of system 100, these platforms may also be used to implement at least portions of other information processing systems in other embodiments.

Figure 11:
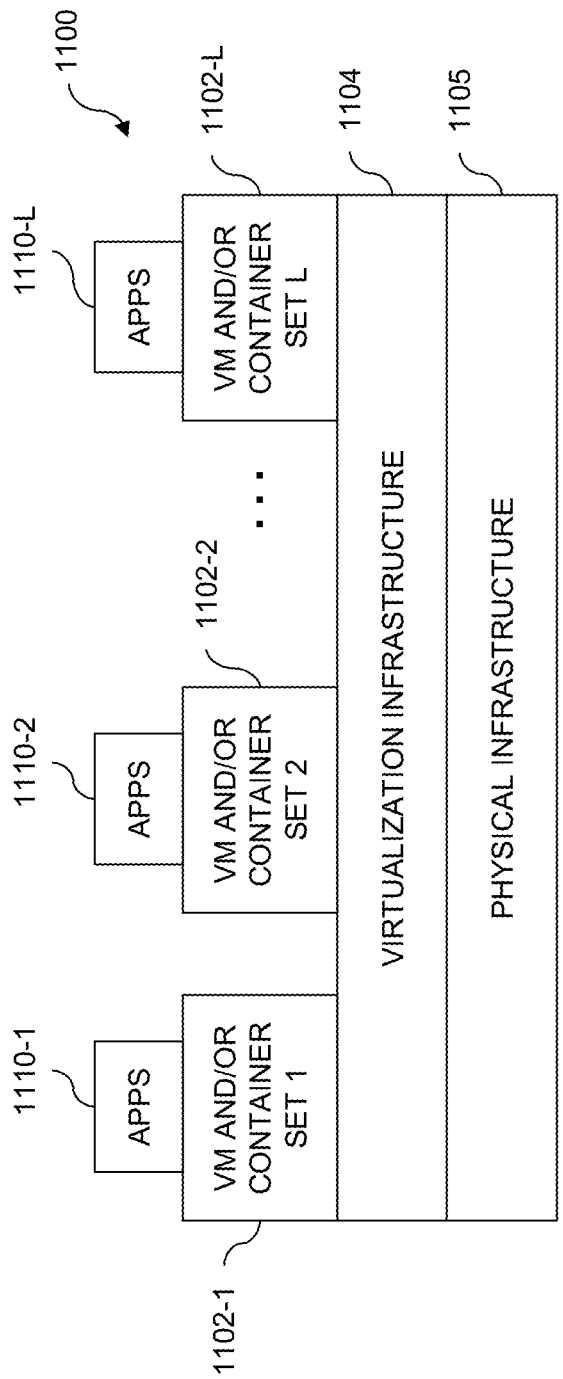
FIGS. 11 and 12 show examples of processing platforms that may be utilized to implement at least a portion of an information processing system in illustrative embodiments.
Figure 12:
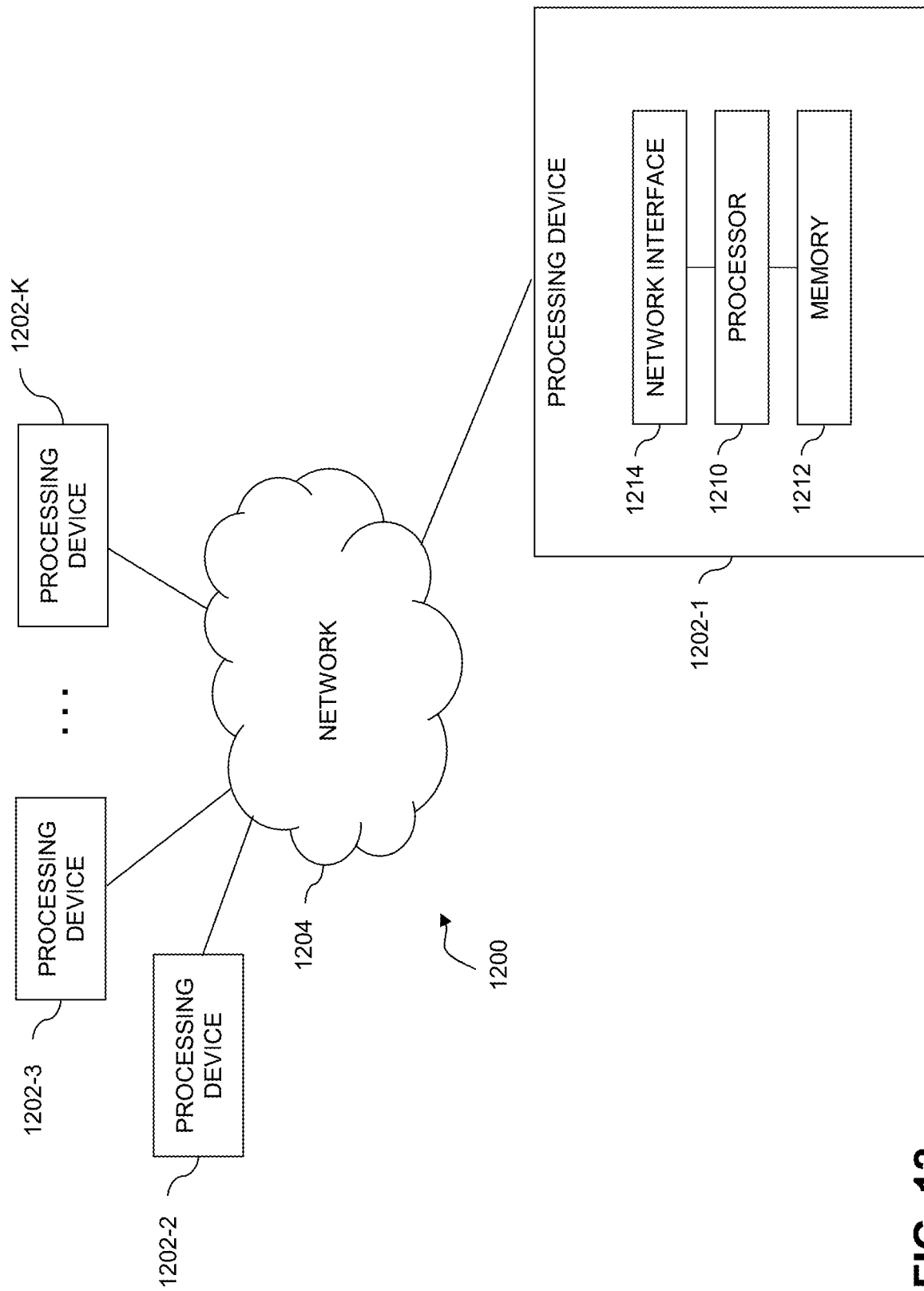

FIG. 11 shows an example processing platform comprising cloud infrastructure 1100. The cloud infrastructure 1100 comprises a combination of physical and virtual processing resources that are utilized to implement at least a portion of the information processing system 100. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 comprise respective VMs, respective sets of one or more containers, or respective sets of one or more containers running in VMs. In some implementations of the FIG. 11 embodiment, the VMs/container sets 1102 comprise respective VMs implemented using virtualization infrastructure 1104 that comprises at least one hypervisor.

A hypervisor platform may be used to implement a hypervisor within the virtualization infrastructure 1104, wherein the hypervisor platform has an associated virtual infrastructure management system. The underlying physical machines comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1202-1 in the processing platform 1200 comprises a processor 1210 coupled to a memory 1212.

The processor 1210 comprises a microprocessor, a microcontroller, an application-specific integrated circuit (ASIC), a field-programmable gate array (FPGA) or other type of processing circuitry, as well as portions or combinations of such circuitry elements.

The memory 1212 comprises random access memory (RAM), read-only memory (ROM) or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining current data from a first storage system and historical data from at least one of the first storage system and one or more additional storage systems;
determining, for the first storage system, at least one current state value for at least one storage system parameter by processing at least a portion of the current data using at least a first hashing algorithm, wherein the at least one storage system parameter comprises at least one storage capacity-related parameter pertaining to capacity-related data comprising capacity used, capacity available, and deduplication information;
determining, for the first storage system with respect to at least one of the first storage system and the one or more additional storage systems, at least one differential state value for the at least one storage system parameter by processing at least a portion of the current data and at least a portion of the historical data using at least a second hashing algorithm, wherein determining at least one differential state value comprises determining, with respect to the one or more additional storage systems, at least one system differential state value for the at least one storage system parameter; and
generating one or more data visualizations based at least in part on the at least one current state value and the at least one differential state value, wherein generating one or more data visualizations comprises generating at least one visual feature of the one or more data visualizations representative of one or more differences between the at least one current state value and a predetermined value of the at least one storage system parameter, and wherein generating one or more data visualizations comprises generating a system differential state data visualization based at least in part on the at least one system differential state value of the first storage system and one or more system differential state values for the one or more additional storage systems, wherein the system differential state data visualization comprises multiple visual indications representing a range of multiple differential state values;
wherein the method is performed by at least one processing device comprising a processor coupled to a memory.

2. The computer-implemented method of claim 1, further comprising:
performing one or more automated actions based at least in part on the one or more data visualizations.

3. The computer-implemented method of claim 1, wherein at least one of the first hashing algorithm and the second hashing algorithm comprises at least one locality sensitive hashing technique.

4. The computer-implemented method of claim 1, wherein determining at least one differential state value comprises determining, across multiple temporal intervals with respect to the first storage system, at least one temporal differential state value for the at least one storage system parameter.

5. The computer-implemented method of claim 4, wherein the multiple temporal intervals comprise at least one of a designated set of temporal intervals and a user-selected set of temporal intervals.

6. The computer-implemented method of claim 1, wherein generating one or more data visualizations comprises generating a current state data visualization based at least in part on the at least current state value, wherein the current state data visualization comprises multiple visual indications representing a range of multiple state values.

7. The computer-implemented method of claim 1, wherein generating one or more data visualizations comprises generating a temporal differential state data visualization based at least in part on the at least one differential state value, wherein the temporal differential state data visualization comprises multiple visual indications representing a range of multiple differential state values.

8. The computer-implemented method of claim 1, wherein the current data and the historical data comprise one or more of configuration-related data, capacity-related data, performance-related data, and information pertaining to data protection.

9. The computer-implemented method of claim 1, wherein the at least one storage system parameter further comprises at least one of at least one configuration-related parameter, at least one performance-related parameter, and at least one data protection parameter.

10. A non-transitory processor-readable storage medium having stored therein program code of one or more software programs, wherein the program code when executed by at least one processing device causes the at least one processing device:
  to obtain current data from a first storage system and historical data from at least one of the first storage system and one or more additional storage systems;
  to determine, for the first storage system, at least one current state value for at least one storage system parameter by processing at least a portion of the current data using at least a first hashing algorithm, wherein the at least one storage system parameter comprises at least one storage capacity-related parameter pertaining to capacity-related data comprising capacity used, capacity available, and deduplication information;
  to determine, for the first storage system with respect to at least one of the first storage system and the one or more additional storage systems, at least one differential state value for the at least one storage system parameter by processing at least a portion of the current data and at least a portion of the historical data using at least a second hashing algorithm, wherein determining at least one differential state value comprises determining, with respect to the one or more additional storage systems, at least one system differential state value for the at least one storage system parameter; and
  to generate one or more data visualizations based at least in part on the at least one current state value and the at least one differential state value, wherein generating one or more data visualizations comprises generating at least one visual feature of the one or more data visualizations representative of one or more differences between the at least one current state value and a predetermined value of the at least one storage system parameter, and wherein generating one or more data visualizations comprises generating a system differential state data visualization based at least in part on the at least one system differential state value of the first storage system and one or more system differential state values for the one or more additional storage systems, wherein the system differential state data visualization comprises multiple visual indications representing a range of multiple differential state values.

11. The non-transitory processor-readable storage medium of claim 10, wherein at least one of the first hashing algorithm and the second hashing algorithm comprises at least one locality sensitive hashing technique.

12. The non-transitory processor-readable storage medium of claim 10, wherein determining at least one differential state value comprises determining, across multiple temporal intervals with respect to the first storage system, at least one temporal differential state value for the at least one storage system parameter.

13. An apparatus comprising:
  at least one processing device comprising a processor coupled to a memory;
  the at least one processing device being configured:
    to obtain current data from a first storage system and historical data from at least one of the first storage system and one or more additional storage systems;
    to determine, for the first storage system, at least one current state value for at least one storage system parameter by processing at least a portion of the current data using at least a first hashing algorithm, wherein the at least one storage system parameter comprises at least one storage capacity-related parameter pertaining to capacity-related data comprising capacity used, capacity available, and deduplication information;
    to determine, for the first storage system with respect to at least one of the first storage system and the one or more additional storage systems, at least one differential state value for the at least one storage system parameter by processing at least a portion of the current data and at least a portion of the historical data using at least a second hashing algorithm, wherein determining at least one differential state value comprises determining, with respect to the one or more additional storage systems, at least one system differential state value for the at least one storage system parameter; and
    to generate one or more data visualizations based at least in part on the at least one current state value and the at least one differential state value, wherein generating one or more data visualizations comprises generating at least one visual feature of the one or more data visualizations representative of one or more differences between the at least one current state value and a predetermined value of the at least one storage system parameter, and wherein generating one or more data visualizations comprises generating a system differential state data visualization based at least in part on the at least one system differential state value of the first storage system and one or more system differential state values for the one or more additional storage systems, wherein the system differential state data visualization comprises multiple visual indications representing a range of multiple differential state values.

14. The apparatus of claim 13, wherein at least one of the first hashing algorithm and the second hashing algorithm comprises at least one locality sensitive hashing technique.

15. The apparatus of claim 13, wherein determining at least one differential state value comprises determining, across multiple temporal intervals with respect to the first storage system, at least one temporal differential state value for the at least one storage system parameter.

16. The apparatus of claim 13, wherein generating one or more data visualizations comprises generating a current state data visualization based at least in part on the at least current state value, wherein the current state data visualization comprises multiple visual indications representing a range of multiple state values.

17. The apparatus of claim 13, wherein generating one or more data visualizations comprises generating a temporal differential state data visualization based at least in part on the at least one differential state value, wherein the temporal differential state data visualization comprises multiple visual indications representing a range of multiple differential state values.

18. The apparatus of claim 13, wherein the current data and the historical data comprise one or more of configuration-related data, capacity-related data, performance-related data, and information pertaining to data protection.

19. The apparatus of claim 13, wherein the at least one storage system parameter further comprises at least one of at least one configuration-related parameter, at least one performance-related parameter, and at least one data protection parameter.

20. The apparatus of claim 13, wherein the at least one processing device is further configured:

to perform one or more automated actions based at least in part on the one or more data visualizations.

* * * * *

UNITED STATES PATENT AND TRADEMARK OFFICE
CERTIFICATE OF CORRECTION

PATENT NO. : 11,709,618 B2
APPLICATION NO. : 17/212767
DATED : July 25, 2023
INVENTOR(S) : Deepak Nagarajegowda and Bina K. Thakkar It is certified that error appears in the above-identified patent and that said Letters Patent is hereby corrected as shown below:

In the Claims

In Claim 6, Column 15, Lines 15-20, replace:
"The computer-implemented method of claim 1, wherein generating one or more data visualizations comprises generating a current state data visualization based at least in part on the at least current state value, wherein the current state data visualization comprises multiple visual indications representing a range of multiple state values."

With:
-- The computer-implemented method of claim 1, wherein generating one or more data visualizations comprises generating a current state data visualization based at least in part on the at least one current state value, wherein the current state data visualization comprises multiple visual indications representing a range of multiple state values. --

In Claim 16, Column 17, Lines 12-17, replace:
"The apparatus of claim 13, wherein generating one or more data visualizations comprises generating a current state data visualization based at least in part on the at least current state value, wherein the current state data visualization comprises multiple visual indications representing a range of multiple state values."

With:
-- The apparatus of claim 13, wherein generating one or more data visualizations comprises generating a current state data visualization based at least in part on the at least one current state value, wherein the current state data visualization comprises multiple visual indications representing a range of multiple state values. --

Signed and Sealed this
Eleventh Day of February, 2025

Coke Morgan Stewart
*Acting Director of the United States Patent and Trademark Office*